United States Patent
Hunter et al.

(10) Patent No.: US 12,141,794 B2
(45) Date of Patent: *Nov. 12, 2024

(54) SYSTEMS AND METHODS FOR TOKEN-BASED CROSS-CURRENCY INTEROPERABILITY

(71) Applicant: JPMORGAN CHASE BANK, N.A., New York, NY (US)

(72) Inventors: John Corwin Hunter, Lithia, FL (US); Umar Farooq, New York, NY (US); Tiffany Ashley Wan, Brooklyn, NY (US); Naveen Mallela, Singapore (SG); Christine Moy, New York, NY (US); Tyrone Lobban, London (GB); Oliver Harris, Woking (GB); Palka S. Patel, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,541

(22) Filed: May 9, 2023

(65) Prior Publication Data

US 2023/0274264 A1    Aug. 31, 2023

Related U.S. Application Data

(63) Continuation of application No. 16/558,415, filed on Sep. 3, 2019, now Pat. No. 11,682,005.

(60) Provisional application No. 62/725,331, filed on Aug. 31, 2018.

(51) Int. Cl.
    *G06Q 20/38*       (2012.01)

(52) U.S. Cl.
    CPC ......... *G06Q 20/381* (2013.01); *G06Q 20/389* (2013.01)

(58) Field of Classification Search
    None
    See application file for complete search history.

(56) References Cited

U.S. PATENT DOCUMENTS

| | | | | |
|---|---|---|---|---|
| 10,055,715 | B1* | 8/2018 | Grassadonia | G06Q 20/3674 |
| 10,243,743 | B1* | 3/2019 | Madisetti | H04L 9/3247 |
| 10,373,158 | B1* | 8/2019 | James | G06Q 40/04 |
| 10,552,905 | B2* | 2/2020 | Wager | G06Q 40/04 |
| 10,649,429 | B2* | 5/2020 | Orsini | G05B 19/042 |
| 10,657,595 | B2* | 5/2020 | de Jong | G06Q 40/04 |
| 11,562,333 | B1* | 1/2023 | James | H04L 9/3247 |
| 11,682,005 | B2* | 6/2023 | Hunter | G06Q 20/389 |
| | | | | 705/44 |

(Continued)

*Primary Examiner* — Christopher Bridges
(74) *Attorney, Agent, or Firm* — GREENBERG TRAURIG LLP (57) ABSTRACT

Systems and methods for token-based cross-currency interoperability are disclosed. In one embodiment, in a first financial institution information processing apparatus comprising at least one computer processor, a method for conducting a token-based cross-currency transaction may include: (1) receiving, from a first party, a transaction initiation request for a transaction amount to a second party; (2) deducting the transaction amount from a fiat currency account for the first party; (3) creating a token amount of tokens for the transaction amount; (4) writing the token amount to a distributed ledger; and (5) transferring the token amount of tokens to a second financial institution for the second party.

7 Claims, 5 Drawing Sheets

(56) References Cited

U.S. PATENT DOCUMENTS

| | | | |
|---|---|---|---|
| 2015/0170112 A1* | 6/2015 | DeCastro | G06Q 20/367 |
| | | | 705/39 |
| 2015/0363769 A1* | 12/2015 | Ronca | G06Q 20/381 |
| | | | 705/64 |
| 2016/0260171 A1* | 9/2016 | Ford | G06Q 20/389 |
| 2017/0300876 A1* | 10/2017 | Musiala, Jr. | G06Q 40/02 |
| 2018/0096313 A1* | 4/2018 | Chenard | G06F 21/64 |
| 2019/0012660 A1* | 1/2019 | Masters | H04L 67/02 |
| 2019/0081789 A1* | 3/2019 | Madisetti | H04L 9/0637 |
| 2019/0213584 A1* | 7/2019 | Shanmugam | G06Q 20/065 |
| 2019/0332691 A1* | 10/2019 | Beadles | G06Q 20/3829 |

\* cited by examiner

SYSTEMS AND METHODS FOR TOKEN-BASED CROSS-CURRENCY INTEROPERABILITY

RELATED APPLICATIONS

This application is a Continuation of U.S. patent Application Ser. No. 16/558,415, filed Sep. 3, 2019, now U.S. Pat. No. 11,682,005, which claims the benefit of U.S. Provisional Patent Application Ser. No. 62/725,331, filed Aug. 31, 2018, the disclosure of each of which is hereby incorporated, by reference, in its entirety

BACKGROUND OF THE INVENTION

1. Field of the Invention

The present disclosure generally relates to systems and methods for token-based cross-currency interoperability.

2. Description of Related Art

As more financial technology companies enter the cross-border payment space, multiple types of digital tokens are emerging. These tokens are not interoperable, making it difficult to transact across borders and platforms.

SUMMARY OF THE INVENTION

Systems and methods for token-based cross-currency interoperability are disclosed. In one embodiment, in a first financial institution information processing apparatus comprising at least one computer processor, a method for conducting a token-based cross-currency transaction may include: (1) receiving, from a first party, a transaction initiation request for a transaction amount to a second party; (2) deducting the transaction amount from a fiat currency account for the first party; (3) creating a token amount of tokens for the transaction amount; (4) writing the token amount to a distributed ledger; and (5) transferring the token amount of tokens to a second financial institution for the second party.

In one embodiment, the first party may operate in a first currency, and the second party may operate in a second currency.

In one embodiment, the token amount may be created in a standard currency.

In one embodiment, the first currency and the standard currency may be the same.

In one embodiment, the fiat currency account may include a line of credit.

In one embodiment, the second financial institution may credit the token amount to an account for the second party.

In one embodiment, the distributed ledger may include an immutable and cryptographically-verifiable distributed ledger.

According to another embodiment, in a first financial institution information processing apparatus comprising at least one computer processor, a method for conducting a token-based cross-currency transaction may include: (1) receiving, from a second financial institution, a token amount of tokens for a transaction from a first party to a second party; (2) crediting the token amount to a fiat currency account for the second party; and (3) writing the credit of the token amount to a distributed ledger.

In one embodiment, crediting the token amount to a fiat currency account for the second party may include redeeming the token amount to the fiat currency.

In one embodiment, the method may further include destroying the tokens for the token amount.

According to another embodiment, in a first financial institution information processing apparatus comprising at least one computer processor, a method for conducting a token-based cross-currency transaction may include: (1) receiving, from a first party, a transaction initiation request for a transaction amount in a first currency to a second party in a second currency; (2) deducting a first token amount of tokens for the transaction amount from an electronic wallet for the first party; and (3) initiating the transaction by writing the first token amount to a distributed ledger. A second financial institution may exchange the first token amount in the first currency for a standard token amount in a standard currency, may exchange the standard token amount in the standard currency to a second token amount in the second currency, and may transfer the second token amount in the second currency to a third financial institution for the second party.

In one embodiment, the method may further include issuing tokens for the first currency to the electronic wallet for the first party.

In one embodiment, the step of deducting a first token amount of tokens for the transaction amount from an electronic wallet for the first party may include deducting the first token amount of tokens for the transaction amount from a line of credit for the first party.

In one embodiment, the first currency and the standard currency may be the same currency.

In one embodiment, the first financial institution and the second financial institution may be the same.

In one embodiment, the second financial institution and the third financial institution may be the same.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for token-based cross-currency interoperability are disclosed. In embodiments, a token bridge between currencies may be used. The token bridge may be based on the United States dollar; other currencies may be used as is necessary and/or desired. For example, a financial institution that issues the tokens may provide foreign exchange between the U.S. dollar tokens and other tokenized and non-tokenized currencies.

In one embodiment, the tokens created may be persisted so that once the tokens are created, they may be used as currency, may earn interest, etc. For example, the tokens may be settled for cash at the end of the day, in the future, based on a position, etc.

Figure 1:
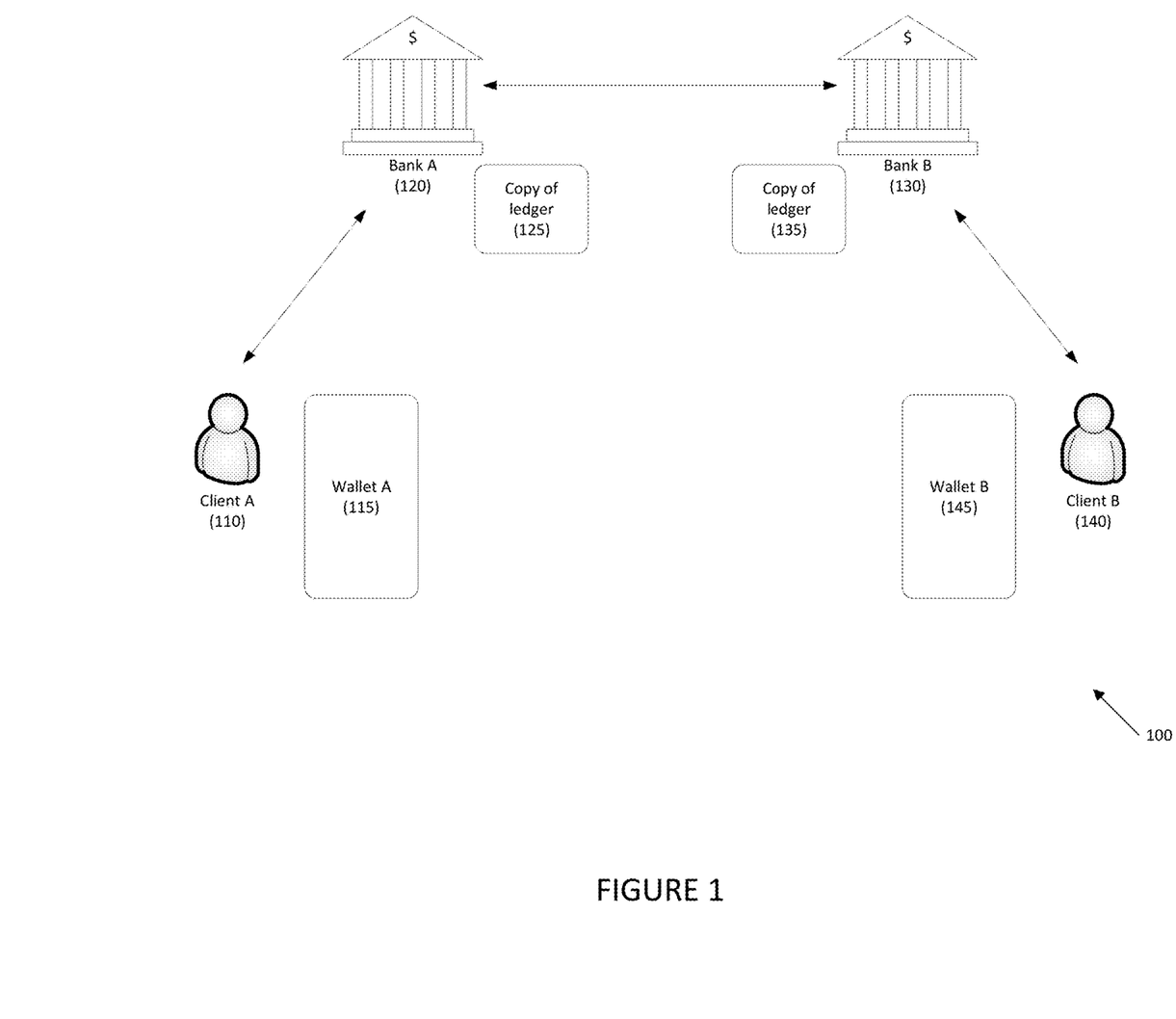
FIG. 1 discloses a system for token-based cross-currency interoperability according to one embodiment.

Referring to FIG. 1, a system for token-based cross-currency interoperability is disclosed according to one embodiment. System 100 may include a plurality of clients (e.g., client A 110 and client B 140), and a plurality of banks (e.g., Bank A 120 and Bank B 130). Although clients 110 and 140 are depicted as individuals, it should be recognized that clients 110 and 140 may be any suitable entity, including individuals, groups of individuals, organizations, companies, etc.

Client 110 may be associated with token wallet 115, and client 140 may be associated with token wallet 145. Token wallets 115 and 145 may be maintained on a distributed ledger (not shown). In one embodiment, token wallets 115 and 145 may store tokens representing currency.

Bank 120 and bank 130 may be associated with customers 110 and 140, respectively. Each bank may facilitate the creation, transfer, and destruction of tokens representing currency. In one embodiment, client 110 and bank 120 may primarily operate in a first currency, and client 140 and bank 130 may operate in a second currency.

In one embodiment, bank 120 and bank 130 may participate as nodes in a distributed ledger, and each bank 120 and 130 may maintain a copy the distributed ledger (e.g., copy of ledger 125 and 135).

Although FIG. 1 depicts two banks, it should be recognized that a greater number of banks may participate as is necessary and/or desired.

In one embodiment, bank 120 and bank 130 may be the same bank.

In one embodiment, additional networks, such as a payment network (not shown) may be provided.

Figure 2:
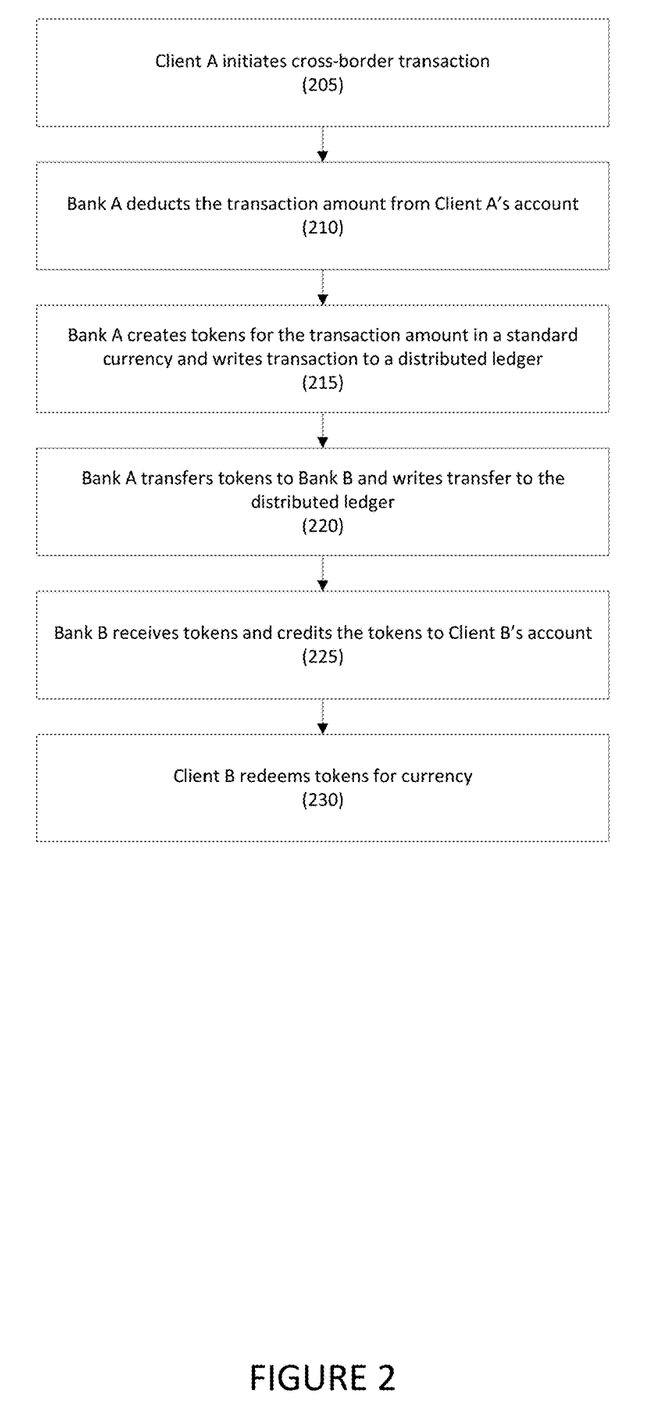
FIG. 2 discloses a method for conducting token-based cross-currency transactions according to one embodiment.

Referring to FIG. 2, a method for conducting token-based cross-currency transactions is disclosed according to one embodiment. In this embodiment, the transaction may be a cross-border transaction, but it may be within the same currency (e.g., U.S. dollars).

In step 205, Client A, a client of Bank A, may initiate a payment to Client B for amount A.

In step 210, Bank A may deduct Client A's account for amount A. In one embodiment, this may be a draw down from Client A's line of credit.

In step 215, Bank A may create Amount A of tokens in a standardized currency (e.g., U.S. dollars) and may write the transaction on a distributed ledger, such as a blockchain-based ledger. In one embodiment, if Client A and Bank A primarily operate in a currency other than U.S. dollars, any necessary currency conversion may be performed.

In one embodiment, any cryptographically-verifiably, immutable ledger may be used as is necessary and/or desired. Examples include Blockchain-based ledgers, Ethereum-based ledgers, etc.

In step 220, Bank A may transfer the tokens to Bank B, and writes the transfer to the distributed ledger.

In step 225, Bank B may receive the tokens, and in step 130, Bank B may credit the amount of tokens to Client B's account. In one embodiment, Client B and Bank B primarily operate in a currency other than U.S. dollars, any necessary currency conversion may be performed.

In step 230, Client B may redeem the tokens for currency.

Figure 3:
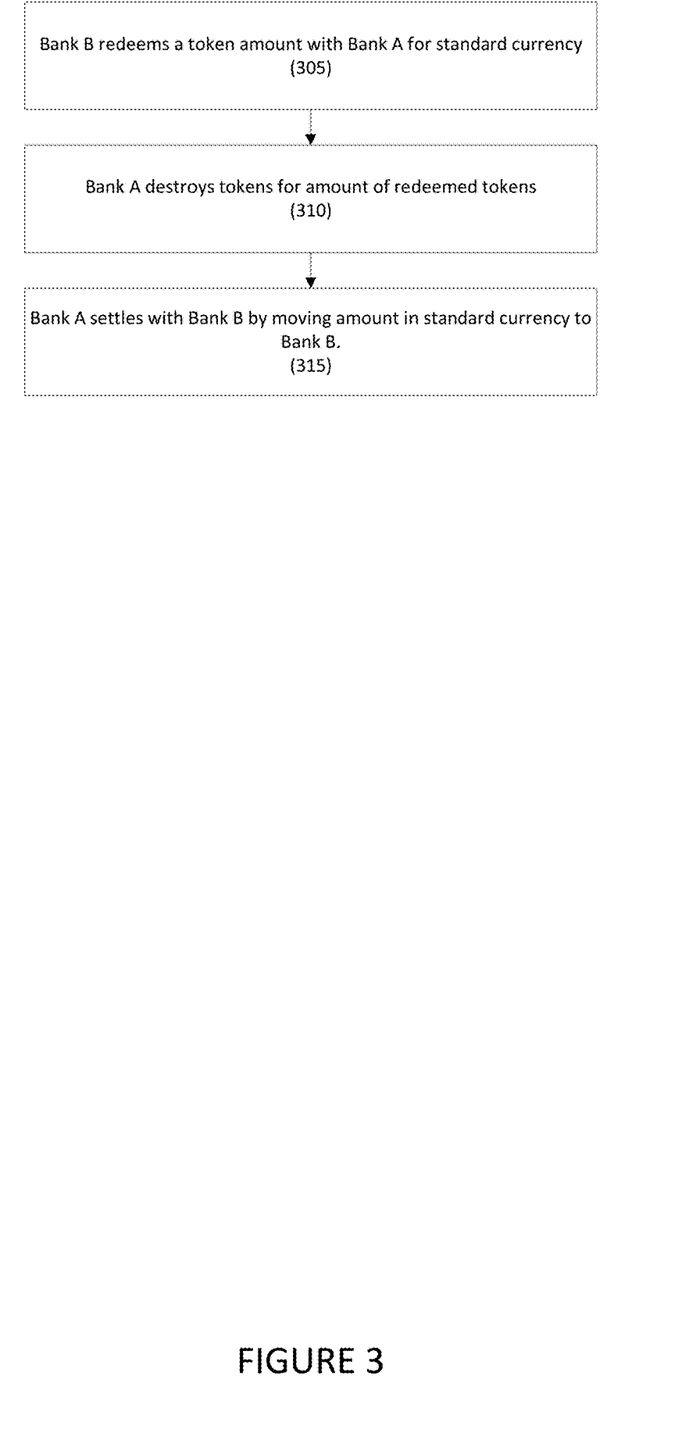
FIG. 3 discloses a method for settlement of token-based cross-currency transactions according to another embodiment.

Referring to FIG. 3, a method for settlement of token-based cross-currency transactions is disclosed according to one embodiment. In step 305, at settlement, Bank B may redeem the tokens with Bank A for a standardized currency, such as U.S. dollars.

In step 310, Bank A may destroy the amount of tokens redeemed on the distributed ledger. This may be by any suitable method.

In step 315, Bank A may settle with Bank B by moving the amount to Bank B. This may be a standard cash movement.

Figure 4:
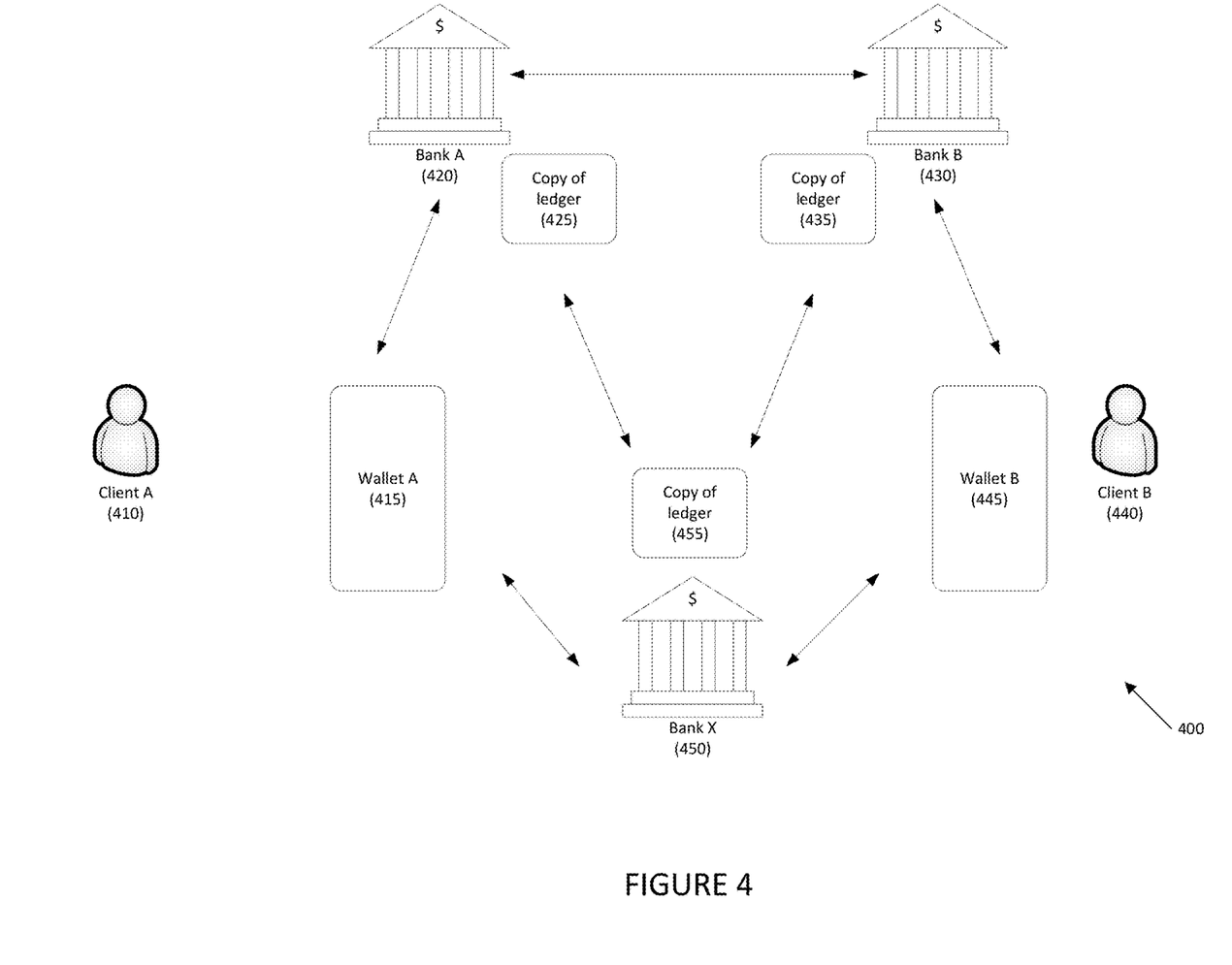
FIG. 4 discloses a system for token-based cross-currency interoperability according to one embodiment.

Referring to FIG. 4, a system for token-based cross-currency interoperability is disclosed according to another embodiment. System 400 may include a plurality of clients (e.g., client A 410 and client B 440), and a plurality of banks (e.g., Bank A 420, Bank B 430, and Bank X 450). Clients 410 and 440 may be similar to clients 110 and 140 described above, and Banks 420 and 430 may be similar to banks 120 and 130, described above.

Bank 450 may provide foreign exchange services for a transaction. In one embodiment, bank 450 may also be a node in the distributed ledger, and may maintain copy of the distributed ledger 455.

In one embodiment, additional networks, such as a payment network (not shown) may be provided.

Figure 5:
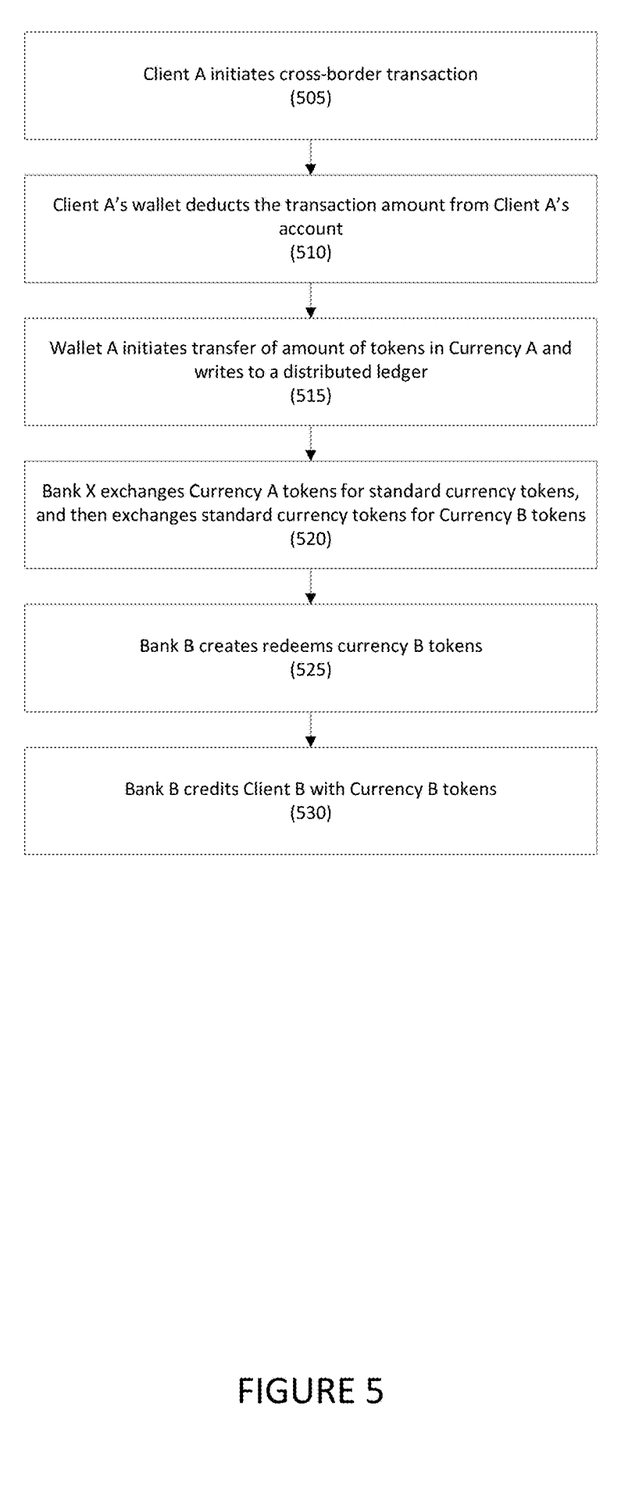
FIG. 5 discloses a method for conducting token-based cross-currency transactions according to one embodiment.

Referring to FIG. 5, a method for conducting token-based cross-currency transactions is disclosed according to one embodiment. In this embodiment, the transaction may be a cross-border transaction, and may be in different currencies (e.g., MXN to INR).

In step 505, Client A (e.g., in Mexico) may initiate a payment of an amount in currency A to Client B (e.g., in India) in currency B. For example, the payment may be in MXN to INR.

Currency A Token Bank and Currency B Token Bank may hold Client A's and Client B's money, respectively, in their own native fiat currencies. Both Currency A Token Bank and Currency A Token Bank may issue tokens representing their own native fiat currencies using, for example, the method of FIG. 2.

In step 510, Client A's Wallet A may deduct the amount from Client A's account. In one embodiment, Wallet A may deduct the amount from Client A's line of credit. In one embodiment, Wallet A may be a suitable electronic wallet that may be tracked on a distributed ledger.

Although wallets are disclosed in this embodiment, it should be understood that accounts with each client's respective bank may be maintained instead. Regardless of whether wallets or accounts are used, the tokens are backed by assets at an anchor bank (e.g., Currency A Token Bank).

In step 515, Wallet A may initiate a transfer of the amount of tokens in Currency A on a distributed ledger.

In response to Wallet A initiating the transfer on the distributed ledger, Currency A Token Bank may create and redeem tokens in Currency A.

In step 520, Bank X may provide a foreign exchange rate and liquidity by exchanging tokens in a standard currency (e.g., U.S. dollar tokens) for Currency A tokens, and then exchanging the standard currency tokens to Currency B tokens.

In step 525, Bank B may create and redeem Currency B tokens. Wallet B then receives Currency B tokens from Bank A.

In step 530, Bank B may credit Client B with Currency B tokens.

Although embodiments may depict the token creation and redemption taking place as part of the transaction, it should be noted that the token creation and/or redemption may occur at any suitable time. For example, tokens may be created before the transaction based on cash collateral and/or credit lines, and there may be a draw-down of the token balance during transaction initiation and execution.

In one embodiment, the token creation and/or redemption may occur independent of a transaction, and the transaction may occur independent of the token creation and/or redemption.

Although the disclosure is in the context of tokenized cash or fiat, it should be understood that credit, collateral, or any other type of asset may be tokenized as is necessary and/or desired.

In embodiments, the representation of cash or fiat as tokens may facilitate other general banking services, in particular "Delivery versus Payment," or "DVP," settlement. DVP is a settlement system that stipulates that cash payment must be made prior to, or simultaneously with, delivery of the security and/or asset. The method for issuing fiat currency on the ledger for transactions may be used for issuance and settlement of any type of security or asset by tokenizing the principal and/or the interest.

For example, a buyer may use tokenized currency to affect a secondary trade of debt securities. Tokenized currency may be exchanged for security interest ownership, and the distributed ledger may maintain a record of the ownership transfer of the security as well as the parties' respective cash positions. Upon execution, the trade would be written to the distributed ledger for clearing. After clearing, the tokenized currency may be held or settled for actual fiat currency as discussed above.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A computer-based method for conducting a token-based cross-currency transaction comprising:
   receiving, by a first computer program executed by a first financial institution information processing apparatus comprising at least one computer processor and from a first party, a transaction initiation request for sending an amount of a first fiat currency to a second party, the second party receiving an equivalent of the amount in a second fiat currency, wherein the first fiat currency and the second fiat currency are different currencies, wherein the first financial institution participates as a first node of a plurality of nodes in a distributed ledger network;

deducting, by the first computer program, the amount of the first fiat currency from a first account for the first party, the first fiat currency account being in the first fiat currency;

converting, by the first computer program, the amount of the first fiat currency into a third fiat currency, the third fiat currency being different from the first fiat currency and the second fiat currency;

creating, by the first computer program, an amount of tokens for the amount of the third fiat currency and writing the tokens to a first financial institution copy of a distributed ledger in the distributed ledger network, wherein the distributed ledger is cryptographically-verifiable and immutable;

receiving, by a second computer program for a second financial institution, the tokens from a second financial institution copy of the distributed ledger, wherein the second financial institution participates as a second node of the plurality of nodes in the distributed ledger network;

converting, by the second computer program, the tokens to the second fiat currency, wherein the tokens are destroyed as a result of the converting;

wherein a change on first financial institution copy of the distributed ledger or the second financial institution copy of the distributed ledger are reflected on the other copies of the distributed ledger.

2. The method of claim 1, wherein the fiat currency account comprises a line of credit.

3. A computer-based system for conducting a token-based cross-currency transaction, comprising:

a first financial institution information processing apparatus for a first financial institution comprising at least one computer processor and executing a first computer program;

a second financial institution information processing apparatus for a second financial institution comprising at least one computer processor and executing a second computer program; and a distributed ledger network, wherein the first computer program and the second computer program are in communication with the distributed ledger network and the first financial institution participates as a first node in the distributed ledger network and the second financial institution participates as a second node in the distributed ledger network;

wherein:

the first computer program executed receives, from a first party, a transaction initiation request for sending an amount of a first fiat currency to a second party, the second party receiving an equivalent of the amount in a second fiat currency, wherein the first fiat currency and the second fiat currency are different currencies;

the first computer program deducts the amount of the first fiat currency from a first account for the first party, the first fiat currency account being in the first fiat currency;

the first computer program converts the amount of the first fiat currency into a third fiat currency, the third fiat currency being different from the first fiat currency and the second fiat currency;

the first computer program creates an amount of tokens for the amount of the third fiat currency and writing the tokens to a first financial institution copy of a distributed ledger in the distributed ledger network, wherein the distributed ledger is cryptographically-verifiable and immutable;

the second computer program receives the tokens from a second financial institution copy of the distributed ledger; and the second computer program converts the tokens to the second fiat currency, wherein the tokens are destroyed as a result of the converting;

wherein a change on first financial institution copy of the distributed ledger or the second financial institution copy of the distributed ledger are reflected on the other copies of the distributed ledger.

4. The system of claim 3, wherein the first account comprises a line of credit account for the first party.

5. The system of claim 3, wherein the first financial institution and the second financial institution are the same.

6. A non-transitory computer readable storage medium, including instructions stored thereon, which when read and executed by one or more computer processors for a first financial institution, cause the one or more computer processors to perform steps comprising:

receiving, from a first party in a distributed ledger network, a transaction initiation request for sending an amount of a first fiat currency to a second party, the second party receiving an equivalent of the amount in a second fiat currency, wherein the first fiat currency and the second fiat currency are different currencies, wherein the first financial institution participates as a first node of a plurality of nodes in a distributed ledger network;

deducting the amount of the first fiat currency from a first account for the first party, the first fiat currency account being in the first fiat currency;

converting the amount of the first fiat currency into a third fiat currency, the third fiat currency being different from the first fiat currency and the second fiat currency;

creating an amount of tokens for the amount of the third fiat currency and writing the tokens to a first financial institution copy of a distributed ledger in the distributed ledger network, wherein the distributed ledger is cryptographically-verifiable and immutable;

receiving the tokens from a second financial institution copy of the distributed ledger, wherein the second financial institution participates as a second node of the plurality of nodes in the distributed ledger network; and converting the tokens to the second fiat currency, wherein the tokens are destroyed as a result of the converting;

wherein a change on first financial institution copy of the distributed ledger or the second financial institution copy of the distributed ledger are reflected on the other copies of the distributed ledger.

7. The non-transitory computer readable storage medium of claim 6, wherein the first account comprises a line of credit account.

* * * * *